United States Patent
Coaplen et al.

(10) Patent No.: US 9,915,313 B2
(45) Date of Patent: Mar. 13, 2018

(54) TWIN TUBE DAMPER

(71) Applicant: Cane Creek Cycling Components, Fletcher, NC (US)

(72) Inventors: Joshua Philip Coaplen, Asheville, NC (US); James Rathbun, Burbank, CA (US)

(73) Assignee: Cane Creek Cycling Components, Fletcher, NC (US)

( * ) Notice: Subject to any disclaimer, the term of this patent is extended or adjusted under 35 U.S.C. 154(b) by 0 days.

(21) Appl. No.: 14/275,423

(22) Filed: May 12, 2014

(65) Prior Publication Data
US 2015/0323035 A1 Nov. 12, 2015

(51) Int. Cl.
| F16F 9/04 | (2006.01) |
| F16F 9/06 | (2006.01) |
| F16F 9/44 | (2006.01) |
| F16F 9/096 | (2006.01) |
| F16F 9/00 | (2006.01) |

(52) U.S. Cl.
CPC .............. *F16F 9/06* (2013.01); *F16F 9/062* (2013.01); *F16F 9/065* (2013.01); *F16F 9/096* (2013.01); *F16F 9/44* (2013.01); *F16F 9/446* (2013.01)

(58) Field of Classification Search
CPC ........ F16F 7/09; F16F 9/00; F16F 9/06; F16F 9/062; F16F 9/064; F16F 9/065; F16F 9/08; F16F 9/092; F16F 9/096; F16F 9/446
USPC ......... 188/298, 314, 315, 322.19; 267/64.19, 267/64.23, 64.27
See application file for complete search history.

(56) References Cited

U.S. PATENT DOCUMENTS

| 3,033,556 | A | * | 5/1962 | Wossner | 267/64.19 |
| 3,212,768 | A | * | 10/1965 | Casimir | 267/34 |
| 3,389,903 | A | * | 6/1968 | Schmid | 267/64.19 |
| 4,469,315 | A | * | 9/1984 | Nicholls | B60G 17/044 188/266.2 |
| 7,635,051 | B2 | * | 12/2009 | Beck | B60G 17/044 188/322.19 |
| 2003/0213664 | A1 | * | 11/2003 | Beck | 188/289 |
| 2007/0175718 | A1 | * | 8/2007 | Beck | 188/315 |
| 2009/0065991 | A1 | * | 3/2009 | Kirchner et al. | 267/124 |
| 2009/0229935 | A1 | * | 9/2009 | Filk | F16F 9/56 188/322.22 |

(Continued)

FOREIGN PATENT DOCUMENTS

DE 102004034106 B3 * 8/2005

*Primary Examiner* — Melody Burch
(74) *Attorney, Agent, or Firm* — Dority & Manning, P.A.

(57) ABSTRACT

Twin tube dampers are provided. In one embodiment, a twin tube damper includes a damping assembly, the damping assembly defining a central longitudinal axis and including an inner tube and an outer tube. The inner tube defines an inner fluid chamber, the outer tube generally surrounds the inner tube and defines an outer fluid chamber, and the outer fluid chamber is in fluid communication with the inner fluid chamber. The twin tube damper further includes a piston assembly, the piston assembly including a piston disposed within the inner fluid chamber and movable generally along the central longitudinal axis. The twin tube damper further includes a fluid reservoir in fluid communication with the damping assembly, the fluid reservoir including a flexible membrane, the flexible membrane generally coaxial with the damping assembly.

18 Claims, 9 Drawing Sheets

(56) References Cited

U.S. PATENT DOCUMENTS

2013/0049310 A1\* 2/2013 Renninger ........... B60G 17/044
                                                                             280/5.514

\* cited by examiner

TWIN TUBE DAMPER

FIELD OF THE INVENTION

The present disclosure relates generally to twin tube style dampers. More particularly, the present disclosure relates to twin tube style dampers having improved damping features which provide more efficient damping and advantageous damper geometry.

BACKGROUND OF THE INVENTION

Twin tube style dampers or shock absorbers are commonly used as part of a suspension system for automobiles, trucks, motorcycles, all-terrain vehicles (ATV), bicycles, industrial equipment and the like for absorbing and dissipating energy. A conventional twin tube type damper generally includes an inner fluid chamber that is at least partially defined by an inner tube, an outer fluid chamber defined by an outer tube that is in fluid communication with the inner fluid chamber, and a piston assembly that extends into the inner tube. Further, these components can be combined with a spring such as an air spring or a helical spring and conventionally referred to as a shock absorber. Certain twin tube style dampers also include a fluid reservoir that is in fluid communication with the inner and the outer fluid chambers via various fluid circuits. A damping fluid fills the inner and the outer fluid chambers and a portion of the fluid reservoir.

In many twin tube style dampers, the fluid reservoir is offset from other components of the damper, such as the chambers. Accordingly, fluid flow into such reservoir can be relatively inefficient, which can reduce the efficiency of the overall damper during operation. Additionally, the excess space utilized by the fluid reservoir can result in the damper being large and cumbersome. Some twin tube style dampers incorporate fluid reservoir features into the chambers, and may thus include for example rigid, movable walls or radially displaceable diaphragms. However, such features may still not provide optimal damper efficiency.

Accordingly, improved twin tube style dampers are desired in the art. In particular, twin tube style dampers which provide more efficient damping and less cumbersome geometry would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a twin tube damper is provided. The twin tube damper includes a damping assembly, the damping assembly defining a central longitudinal axis and including an inner tube and an outer tube. The inner tube defines an inner fluid chamber, the outer tube generally surrounds the inner tube and defines an outer fluid chamber, and the outer fluid chamber is in fluid communication with the inner fluid chamber. The twin tube damper further includes a piston assembly, the piston assembly including a piston disposed within the inner fluid chamber and movable generally along the central longitudinal axis. The twin tube damper further includes a fluid reservoir in fluid communication with the damping assembly, the fluid reservoir including a flexible membrane, the flexible membrane generally coaxial with the damping assembly.

In accordance with one embodiment of the present disclosure, a twin tube damper is provided. The twin tube damper includes a damping assembly, the damping assembly defining a central longitudinal axis and extending between a first end and a second end. The first end and the second end are spaced apart and generally coaxially aligned along the central longitudinal axis. The damping assembly includes an inner tube and an outer tube. The inner tube defines an inner fluid chamber, the outer tube generally surrounds the inner tube and defines an outer fluid chamber, and the outer fluid chamber is in fluid communication with the inner fluid chamber. The twin tube damper further includes a piston assembly, the piston assembly including a piston disposed within the inner fluid chamber and movable generally along the central longitudinal axis. The twin tube damper further includes a fluid reservoir in fluid communication with the damping assembly and extending from the first end generally along the central longitudinal axis, the fluid reservoir including a flexible membrane, the flexible membrane deformable generally along the central longitudinal axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 5, embodiments of a twin tube style damper 10 ("damper 10") in accordance with the present disclosure are illustrated. Damper 10 may include, for example, a damping assembly 12, a piston assembly 14, and a fluid reservoir 16. Damper 10 may in some embodiments, such as when utilized as a shock absorber, additionally include a spring assembly 45. As discussed herein, such components may generally be aligned along and/or coaxial with a central longitudinal axis 18 of the damping assembly 12. Such arrangement, and the respective components utilized to form the damping assembly 12, piston assembly 14, fluid reservoir 16, and spring assembly 45 may advantageously provide an efficient, lightweight, un-burdensome, damper or shock absorber 10.

As illustrated, damping assembly 12 may extend between a first end 22 and a second end 24. The first end 22 and second end 24 may be spaced apart from each other, such as generally along the axis 18, and may be generally coaxially aligned along the axis 18. The damping assembly 12 may further include an inner tube 26 and an outer tube 28. The outer tube 28 may generally surround the inner tube 26, such that the inner tube 26 is generally encased in the outer tube 28. Inner tube 26 may define an inner fluid chamber 27, and outer tube 28 may define an outer fluid chamber 29 which generally surrounds the inner tube 26. The outer fluid chamber 29 may be in fluid communication with the inner fluid chamber 27, such as through one or more orifices 30 defined in the inner tube 26. Accordingly, a damping fluid disposed in the damping assembly 12 may flow within and between the inner fluid chamber 27 and the outer fluid chamber 29. In exemplary embodiments, the damping fluid is a liquid, such as an oil.

Piston assembly 14 may include a piston 32. The piston 32 may be disposed and movable within the inner fluid chamber 27. In exemplary embodiments as illustrated, the piston 32 may be movable generally along the axis 18. Typically, the piston 32 is generally disk-shaped, and may form a seal again the inner tube 26. Further, one or more orifices 34 may be defined in the piston 32. The orifices 34 may allow fluid flow (in particular damping fluid flow) therethrough. During operation, the piston 32 may be movable in a compression stroke (towards the first end 22 of the damping assembly 12) and an opposing rebound stroke (towards the second end 24 of the damping assembly 14).

The piston assembly 14 may further include a shaft 40, which may extend between a first end 42 and a second end 44. The first end 42 and second end 44 may be spaced apart from each other, such as generally along the axis 18, and may be generally coaxially aligned along the axis 18. As illustrated, first end 42 may be connected to the piston 32, while second end 44 may be exterior to the damping assembly 12. For example, the shaft 40 may extend through the inner tube 26 and outer tube 28, such that second end 44 is exterior to both tubes and the damping assembly 12 in general.

As discussed, in some embodiments, damper 10 may further include a spring assembly 45. Such damper 10 with spring assembly 45 may conventionally be referred to as a shock absorber. Spring assembly 45 may include an inner tube 46 and an outer tube 48. As illustrated, the second end 44 of the shaft 40 may be disposed within the tubes 46 and 48, such as within an inner fluid chamber 47 defined by the inner tube 46. The outer tube 48 may generally surround the inner tube 46, such that the inner tube 46 is generally encased in the outer tube 48. In exemplary embodiments as illustrated, the inner tube 46 and outer tube 48 may advantageously each be generally coaxial with the damping assembly 12. Inner tube 46 may define an inner fluid chamber 47, and outer tube 48 may define an outer fluid chamber 49 which generally surrounds the inner tube 46. The outer fluid chamber 49 may be in fluid communication with the inner fluid chamber 47, such as through one or more orifices 50 defined in the inner tube 46. Accordingly, an auxiliary fluid disposed in the spring assembly 45 may flow within and between the inner fluid chamber 47 and the outer fluid chamber 49. In exemplary embodiments, the auxiliary fluid is gas, such as air.

Spring assembly 45 may further include a valve 52, which may extend through outer tube 48 and be in selective fluid communication with the outer fluid chamber 49. Additional auxiliary fluid, such as air, may be flowed into the outer fluid chamber 49 as desired, and/or auxiliary fluid may be flowed from the outer fluid chamber 49, through the valve 52.

It should be understood that the damping fluid and auxiliary fluid may be generally sealed and isolated from each other, such as by piston 32. Accordingly, the damping assembly 12 and spring assembly 45 are generally not in fluid communication.

Fluid reservoir 16, as illustrated, may be in fluid communication with the damping assembly 12. The fluid reservoir 16 may generally accept damping fluid from the damping assembly 12, and flow damping fluid to the damping assembly 12, in an open circuit fashion during operation of the damper 10. For example, the fluid reservoir 16 may extend from the first end 22 of the damping assembly 12. A first orifice 60 may be defined in the damping assembly 12, such as between the inner fluid chamber 27 and a fluid chamber of the fluid reservoir 16 (discussed below). A second orifice 62 may be defined in the damping assembly 12, such as between the outer fluid chamber 29 and the fluid chamber of the fluid reservoir 16. These orifices may provide the fluid communication between the damping assembly 12 and fluid reservoir 16.

For the purposes of illustration, it is convenient to define a compression chamber CC and a rebound chamber RC of the damping assembly 12. The compression chamber CC is defined as the volume, filled with damping fluid, on one side of the piston 32 between the piston 32 and the first orifice 60 along a direction of flow of the fluid from the piston 32 to the first orifice 60. The compression chamber CC is at a higher pressure than the remainder of the damper 10 during the compression stroke. The rebound chamber RC is defined as the volume, filled with damping fluid, on the other side of the piston 32 between the piston 32 and the second orifice 62 along a direction of flow of the fluid from the piston 32 to the second orifice 62. The rebound chamber RC is at a higher pressure than the remainder of the damper 10 during the rebound stroke. The actual volume of both the compression chamber CC and the rebound chamber RC depends on the position of the piston 32 in the damper 10.

Returning to the fluid reservoir 16, in exemplary embodiments as illustrated the fluid reservoir includes a flexible membrane 70. Typically, the flexible membrane is formed from rubber. Alternatively, any suitable deformable material, preferably with low gas permeability, may be utilized. As discussed, the fluid reservoir 16 may extend from the first end 22 of the damping assembly 12. In exemplary embodiments as illustrated, the fluid reservoir 16 may extend from the first end 22 generally along the axis 18. Further, advantageously, the flexible membrane 70 may be deformable generally along the axis 18. Additionally or alternatively, the flexible membrane 70 may advantageously be coaxial with the damping assembly 12. Such use and arrangement of a flexible membrane 70 in accordance with the present disclosure advantageously facilitates the efficient operation and design of the damper 12 generally, due to the in-line nature of the various components of the damping assembly 12 and fluid reservoir 16 along the axis 18.

The fluid reservoir 16 may define a fluid chamber 72 and a biasing chamber 74. The fluid chamber 72 and biasing chamber 74 may, for example, be spaced apart generally along the axis 18, such as by the flexible membrane 70. In exemplary embodiments as illustrated, the fluid chamber 72 and biasing chamber 74 may advantageously be coaxial with the damping assembly 12. The fluid chamber 72 may be in fluid communication with the damping assembly 12, such as through first and second orifices 60, 62. Accordingly, damping fluid may flow into the fluid chamber 72 from the damping assembly 12 and from the fluid chamber 72 into the damping assembly 12 during operation of the damper 12. The flexible membrane 70 may separate and generally isolate the fluid chamber 72 and biasing chamber 74. A biasing fluid may be disposed within the biasing chamber 74. In exemplary embodiments, the biasing fluid may be a gas, such as air. The pressure within the biasing chamber 74 due to the fluid in the biasing chamber 74 may generally bias the flexible membrane 70 away from the biasing chamber 74 and towards the fluid chamber 72, such as generally along the axis 18.

As discussed, the use of a fluid reservoir 16 and flexible membrane 70, and the orientation thereof relative to the damping assembly 12, may advantageously provide an improved damper 12. Specifically, the in-line orientation of such features such that they are, for example, coaxial with the damping assembly 12 and/or deformable along the axis 18 facilitates such improvements, providing an efficient, sleek damper 10.

Fluid reservoir 16 may further include additional features which facilitate the efficient operation of the damper 12. In particular, such features may facilitate easy and efficient adjustment of the damping characteristics of the damper 10. For example, fluid reservoir 16 may include features as disclosed in U.S. patent application Ser. No. 13/975,967, filed Aug. 26, 2013, entitled "A Twin Tube Style Damper with Selectable Bypass Flow Passages", which is incorporated by reference herein in its entirety.

Referring to FIGS. 6 through 9, embodiments of features of the fluid reservoir 16 are illustrated. In particular, components and flow passages of the fluid chamber 72 of the fluid reservoir 16 are illustrated. As discussed, the damping assembly 12 and the fluid reservoir 16 are in fluid communication, such as through first and second orifices 60, 62. Damping fluid may flow from the damping assembly 12, such as through first and second orifices 60, 62, to the fluid chamber 72 and from the fluid chamber 72, such as through first and second orifices 60, 62, to the damping assembly 12. As illustrated, the first orifice 60 may be in fluid communication with a first fluid circuit 102 of the fluid chamber 72, and the second orifice 62 may be in fluid communication with a second fluid circuit 104 of the fluid chamber 72.

The first and second fluid circuits 102, 104 may be in fluid communication with each other. For example, both circuits 102, 104 may flow into a common chamber 106. The common chamber 106 may house damping fluid therein and generally equalize the pressure between the circuits 102, 104. Fluid within common chamber 106 may be in contact with the flexible membrane 70.

In general, the flow path of damping fluid through the fluid reservoir components may be in one direction during a compression stroke, and in the opposite direction during a rebound stroke. For example, fluid may flow through first orifice 60 into the first fluid circuit 102, from the circuit 102 into the common chamber 106, from the common chamber 106 to the second fluid circuit 104, and from the second fluid circuit 104 to the second orifice 62 during the compression stroke. Fluid may flow oppositely through second orifice 62 into the second fluid circuit 104, from the circuit 104 into the common chamber 106, from the common chamber 106 to the first fluid circuit 102, and from the first fluid circuit 102 to the first orifice 60 during the rebound stroke. Referring to FIGS. 6 through 9, arrows indicating the flow directions of damping fluid are shown for a rebound stroke. The flow directions for a compression stroke are generally opposite to those indicated for the rebound stroke. It should be understood that when fluid flow is described herein in the context of a compression stroke or rebound stroke, fluid flow in the opposite direction may occur during the other of the compression stroke or rebound stroke.

First fluid circuit 102 may include a primary flow passage 110. Damping fluid may flow through the primary flow passage 110 between the common chamber 106 and first conduit 60. Similarly, second fluid circuit 104 may include a primary flow passage 112. Damping fluid may flow through the primary flow passage 112 between the common chamber 106 and second conduit 62.

Figure 1:
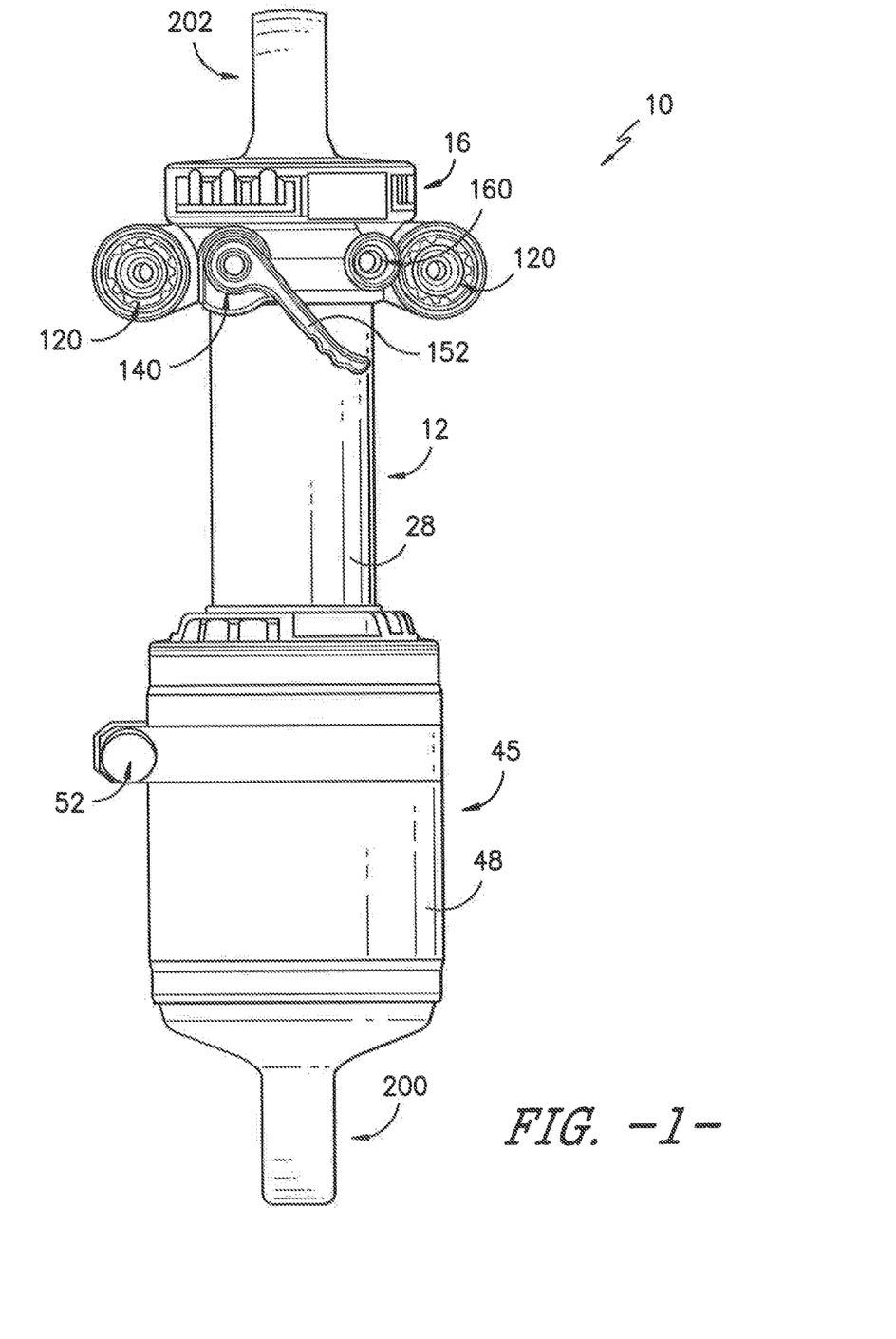
FIG. 1 is a side view of a twin tube style damper in accordance with one embodiment of the present disclosure.
Figure 2:
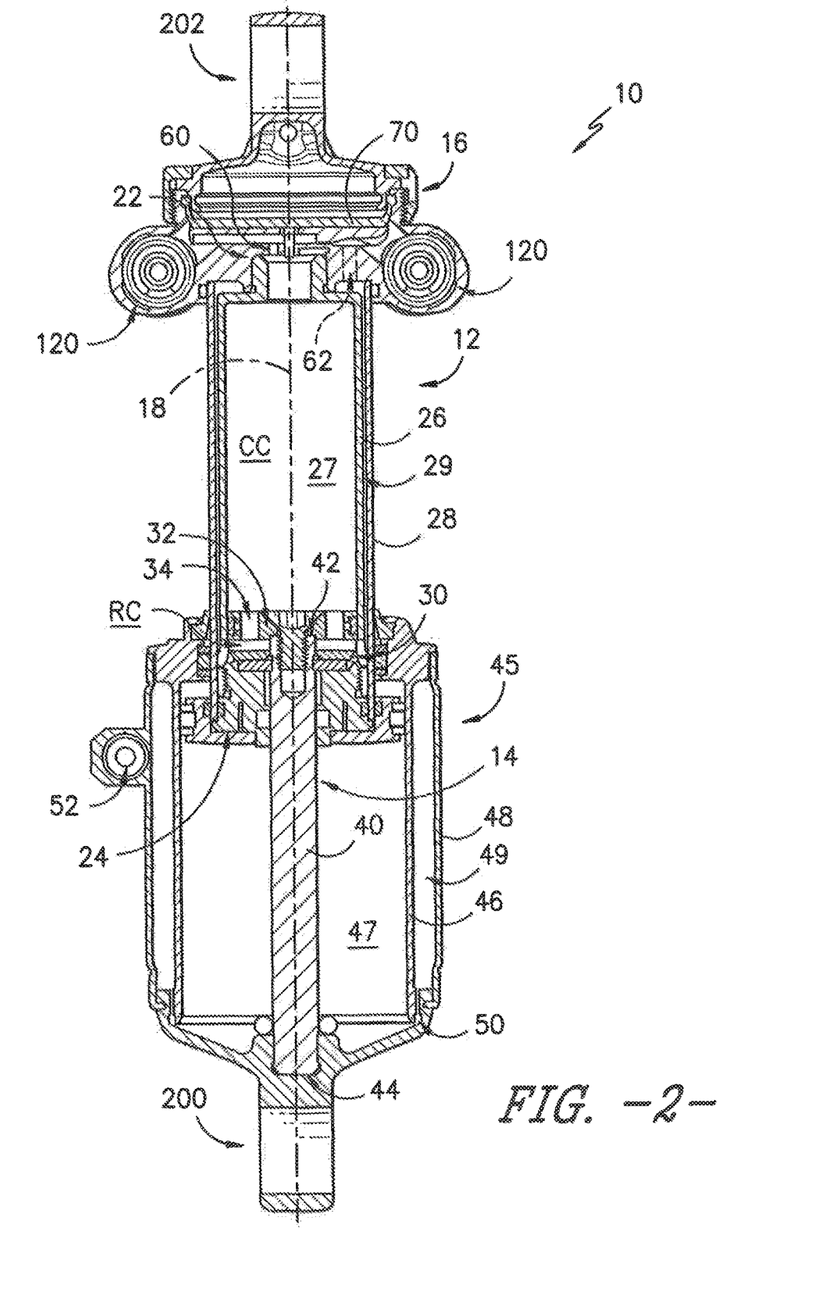
FIG. 2 is a side cross-sectional view of a twin tube style damper in accordance with one embodiment of the present disclosure.
Figure 3:
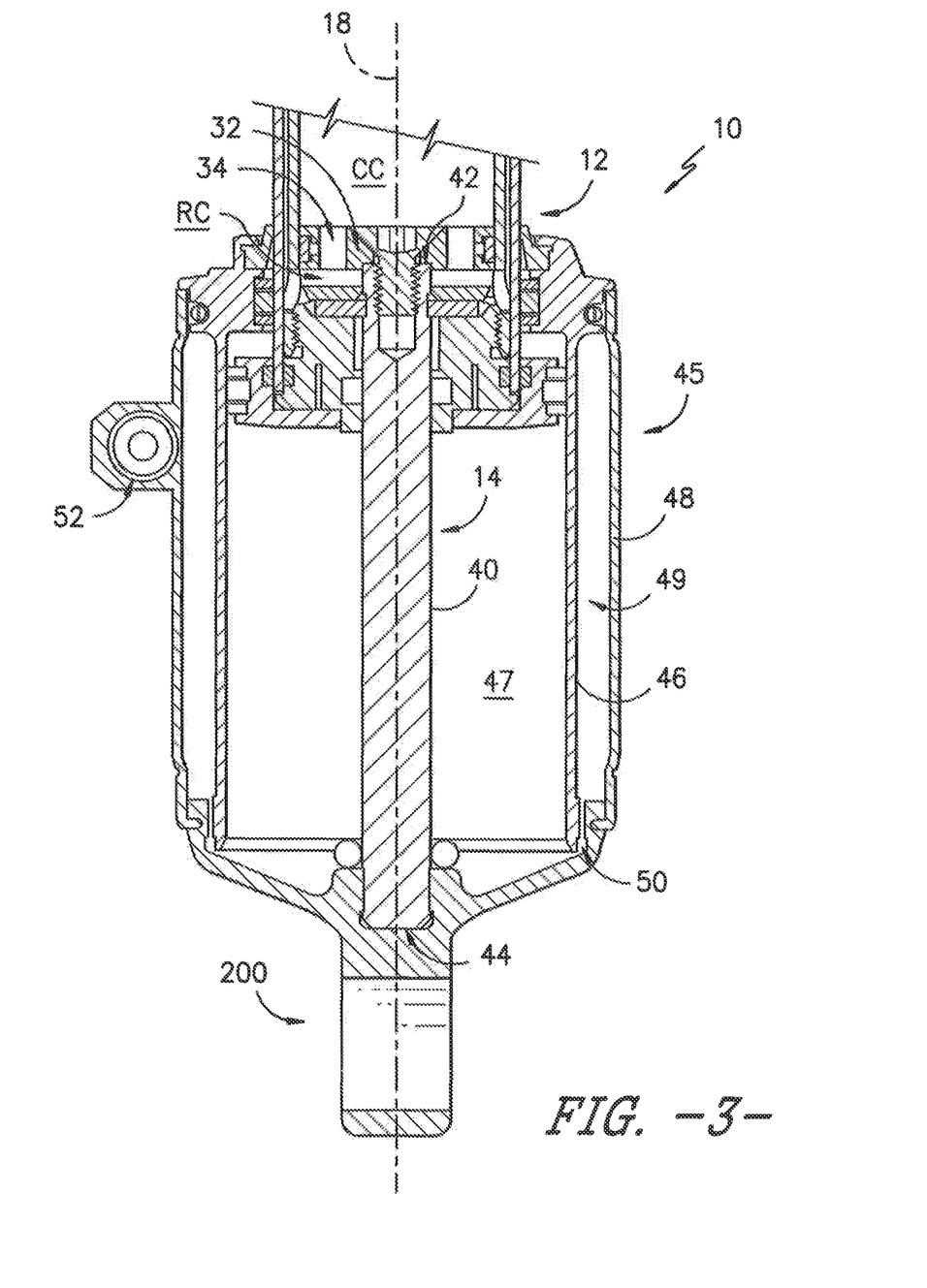
FIG. 3 is a close-up side cross-sectional view of a lower portion of the twin tube style damper of FIG. 2.
Figure 4:
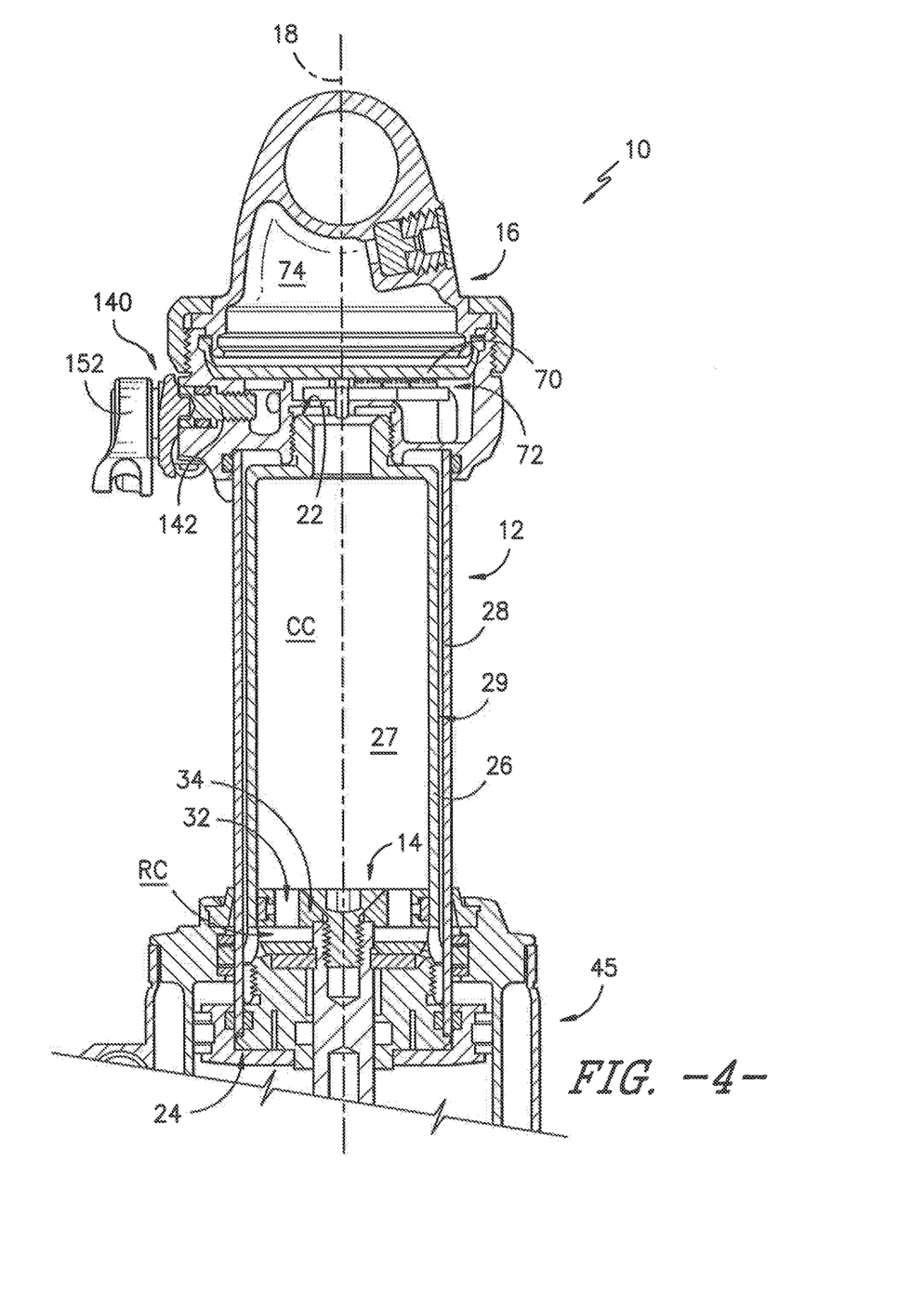
FIG. 4 is a close-up side cross-sectional view of a middle portion of a twin tube style damper taken perpendicularly to the view of FIGS. 2 and 3 in accordance with one embodiment of the present disclosure.
Figure 5:
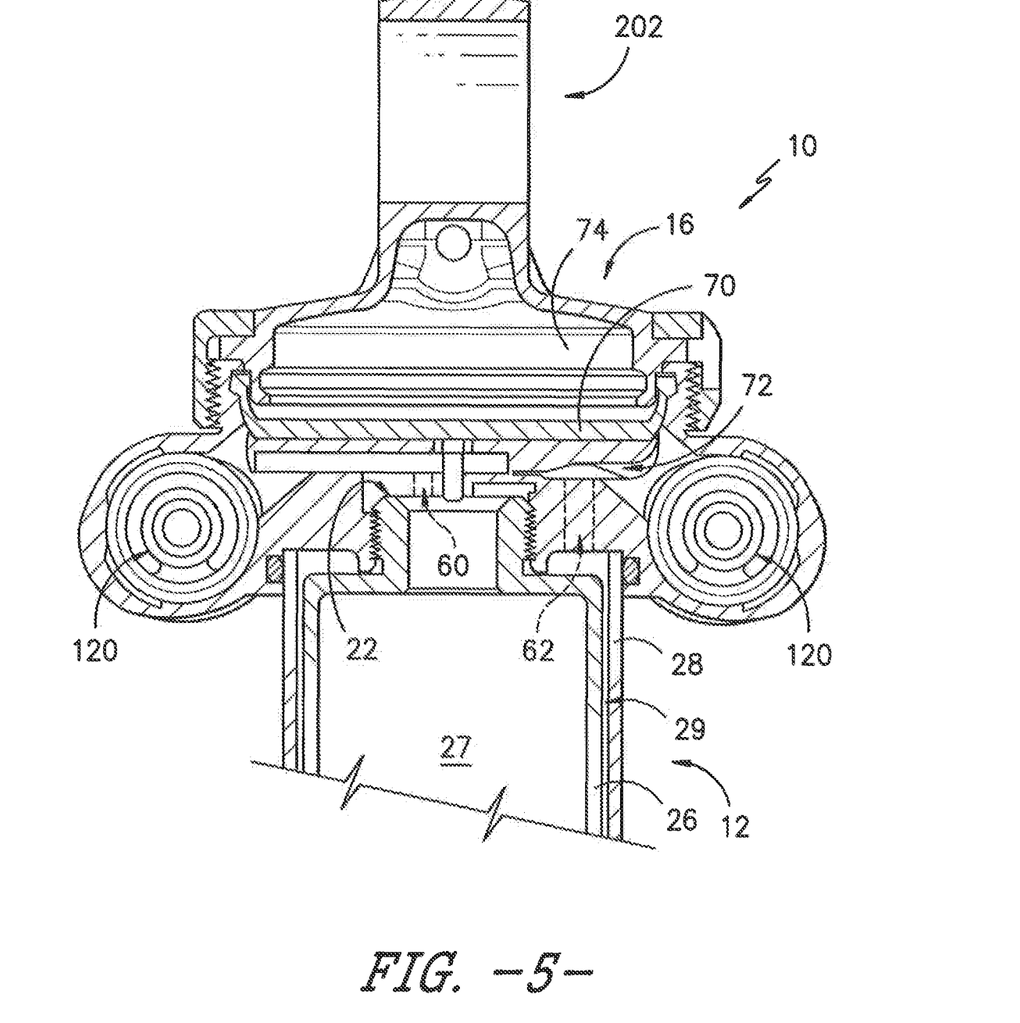
FIG. 5 is a close-up side cross-sectional view of an upper portion of the twin tube style damper of FIG. 2.
Figure 6:
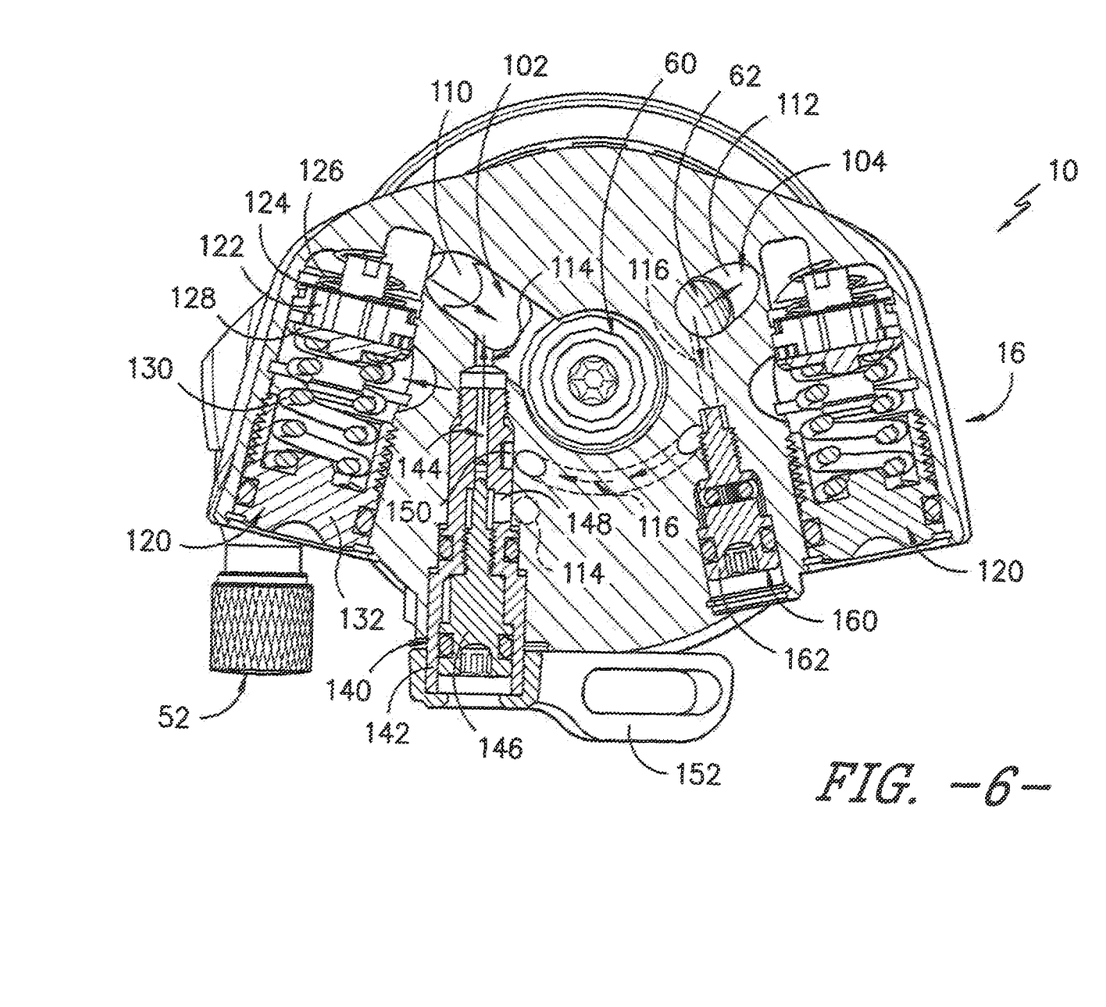
FIG. 6 is a top cross-sectional view of a twin tube style damper in accordance with one embodiment of the present disclosure.
Figure 7:
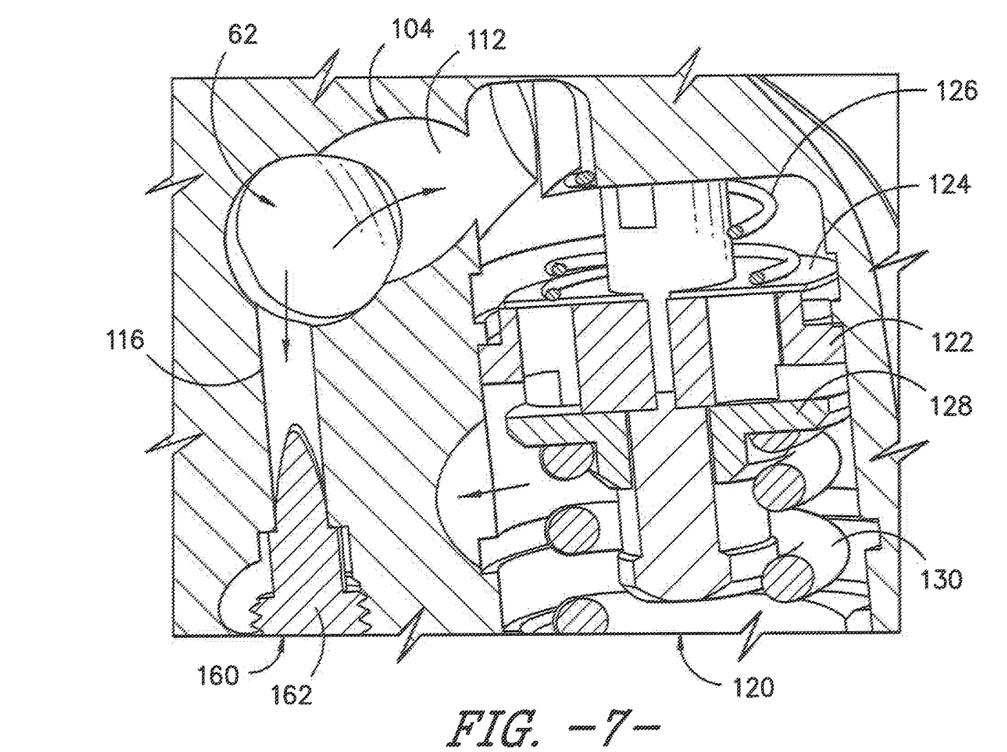
FIG. 7 is a top perspective cross-sectional view of a twin tube style damper in accordance with one embodiment of the present disclosure.
Figure 8:
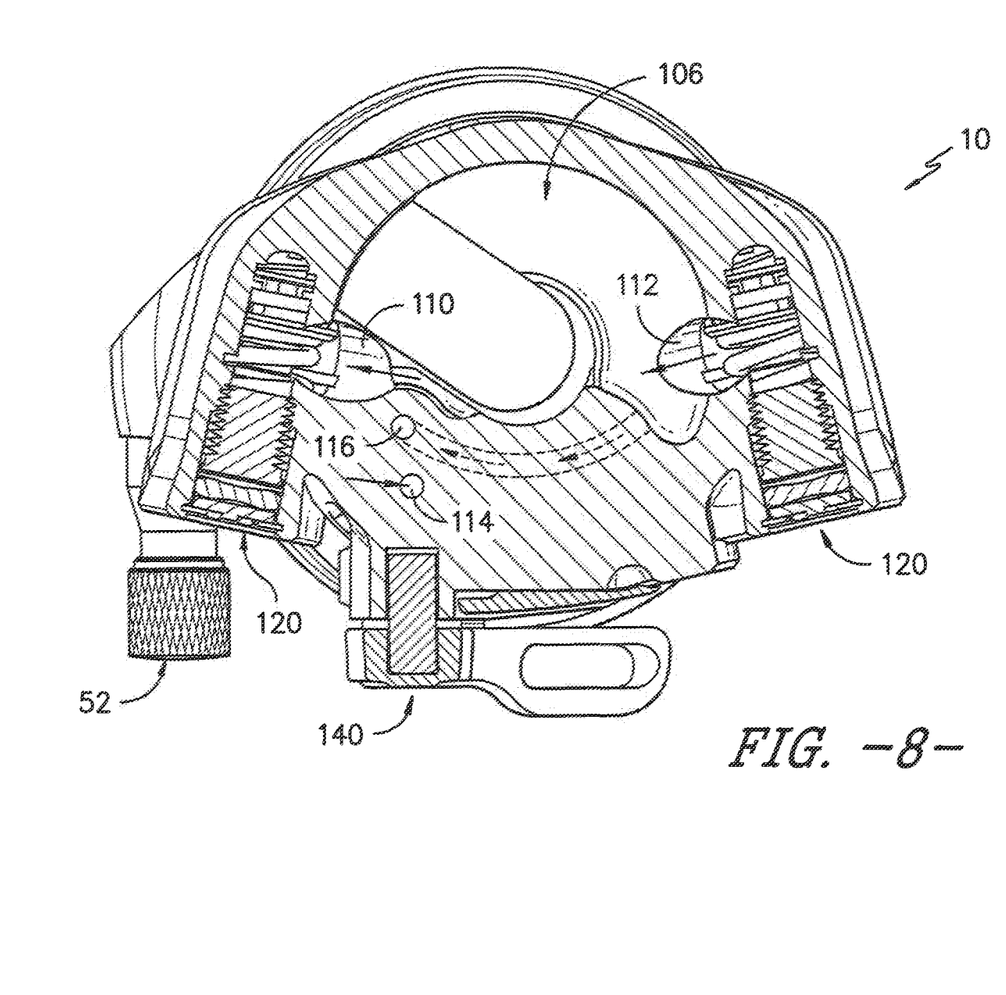
FIG. 8 is a top cross-sectional view of a twin tube style damper, taken above the view of FIG. 6, in accordance with one embodiment of the present disclosure.
Figure 9:
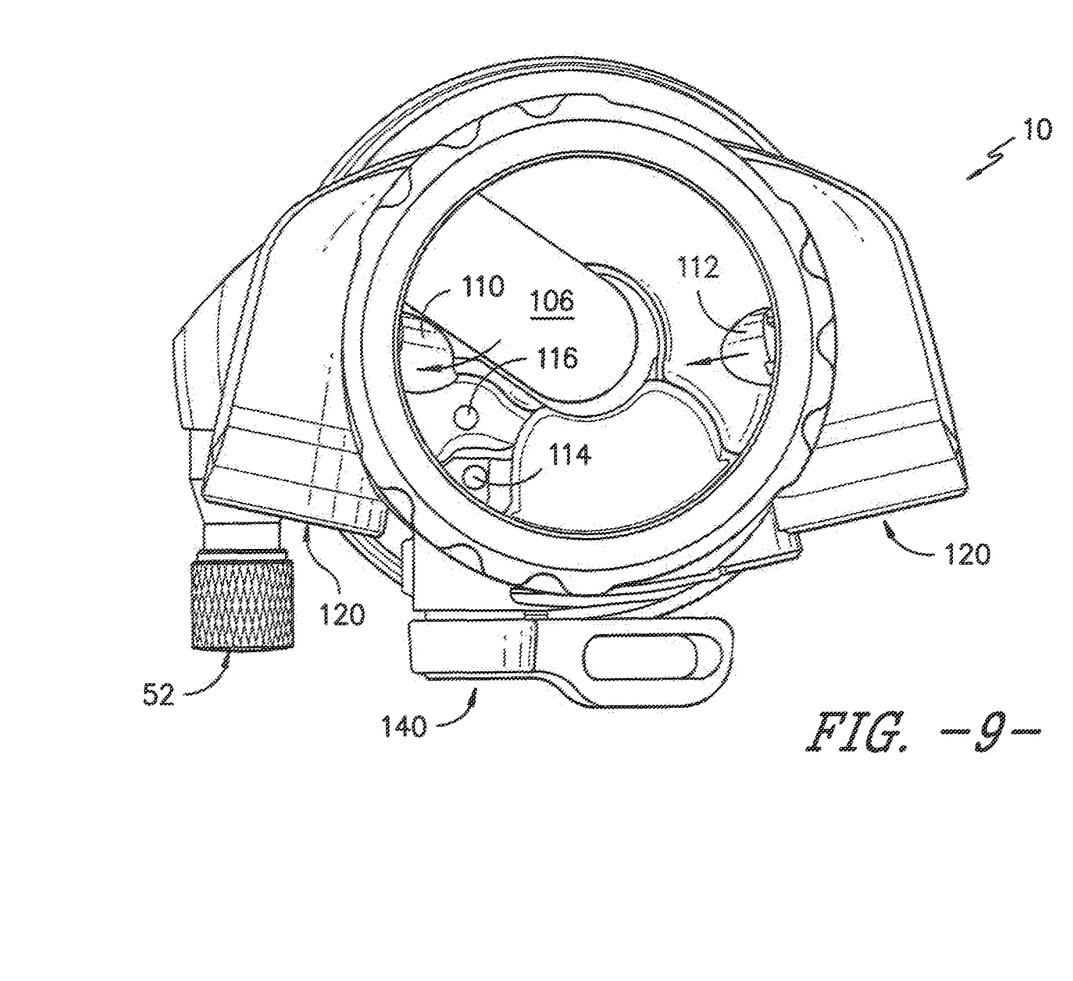
FIG. 9 is a top cross-sectional view of a twin tube style damper, taken above the view of FIG. 8, in accordance with one embodiment of the present disclosure.

A valve assembly 120 may be included in each flow passage 110, 112. FIG. 7 illustrates various components of a valve assembly 120. The valve assembly 120 may meter the flow of damper fluid therethrough and therepast, and thus through the respective flow passage 110, 112. Valve assembly 120 may include, for example, a generally stationary piston 122, a shim 124 disposed adjacent a first end of the piston 122, a shim spring 126 biasing the shim 124 towards the piston 122, a poppet 128 disposed adjacent a second end of the piston 122, and a main spring 130 biasing the poppet 128 towards the piston 122. The valve assembly 120 may further include an adjustable knob 132, which may be in contact with the main spring 130. Adjustment of the adjustable knob 132 may adjust the biasing force of the spring 130. Such adjustment may advantageously be easily performed by a user by engaging an outer surface of the adjustable knob 132, which is accessible externally of the damper 10 generally. A screwdriver, allen wrench, or other suitable tool may be utilized to engage the adjustable knob 132, or a user may engage the adjustable knob by hand.

With regard to the valve assembly 120 in the flow passage 110, during a compression stroke, damping fluid may flow around the shim 124 and through the piston 122. The fluid may then encounter the poppet 128. When enough pressure has built up against the poppet 128 to overcome the force of the main spring 130, the poppet 128 may move away from the piston 122, allowing fluid flow past the poppet 128 and from the primary flow passage 110 into the common chamber 106. With regard to the valve assembly 120 in the flow passage 112, during a compression stroke, damping fluid may flow around the poppet 128 and through the piston 122. The fluid may then encounter the shim 124. When enough pressure has built up against the shim 124 to overcome the force of the shim spring 126, the shim 124 may move away from the piston 122, allowing fluid flow past the shim 124 and from the primary flow passage 112 into the second orifice 62.

During a rebound stroke, the flow through the valve assemblies 120 disposed in the primary flow passages 110, 112 are generally opposite. Accordingly, the valve assembly 120 in the primary flow passage 110 operates as described above for the valve assembly 120 in the primary flow passage 112, and the valve assembly 120 in the primary flow passage 112 operates as described above for the valve assembly 120 in the primary flow passage 110.

First fluid circuit 102 may additionally include a bypass flow passage 114. The bypass flow passage 114 may be in fluid communication with, and disposed between, the primary flow passage 110 and the common chamber 106. In exemplary embodiments as illustrated, a bypass valve assembly 140 may be disposed in the fluid chamber 72, and may meter the flow of damper fluid through the bypass flow passage 114.

The bypass valve assembly 140 may include a spool valve 142 defining a passage 144 therethrough, and a needle valve 146 disposed within the spool valve. A bypass aperture 148 may additionally be defined in the needle valve 146, and may extend between the passage 144 and an external surface of the spool valve 142. Needle valve 146 may be adjustable to generally meter flow into and through the passage 144. During a compression stroke, if the needle valve 146 is open, damper fluid may flow into the spool valve 142 through the passage 144. Spool valve 142 may be adjustable to generally meter flow from the passage 144 through the aperture 148. During a compression stroke, if the spool valve 142 is open and the aperture 148 is thus aligned with a downstream portion of bypass flow passage 114 (see also FIGS. 8 and 9), damper fluid may exit the assembly 140 through the aperture 148. After exiting the assembly 140 through the bypass aperture 148, the fluid may be free to flow from the bypass flow passage 114 to the common chamber 106. During a rebound stroke, if the spool valve 142 and needle valve 146 are open, damper fluid may flow in the opposite direction.

Adjustment of the spool valve 142 may adjust the flow through the bypass aperture 148. For example, in a closed position, the bypass aperture 148 may be blocked from fluid communication with the downstream portion of the bypass flow passage 114, preventing fluid flow from the bypass aperture 148 to the bypass flow passage 114. In a fully open position, the spool valve 142 may allow maximum flow of damper fluid through the bypass aperture 148 to the bypass flow passage 114. In exemplary embodiments, such adjustment can advantageously be easily performed by a user by engaging a switch 152 connected to the spool valve 142. Alternatively, such adjustment may advantageously be easily performed by a user by otherwise engaging an outer surface of the spool valve 142.

Spool valve 142 may additionally include a channel 150 defined in a portion of the outer surface thereof. During a rebound stroke, if the spool valve 142 is open, damper fluid may flow into the channel 150 and through the channel 150 from a bypass flow passage 116 of the second fluid circuit 104. Adjustment of the spool valve 142 may adjust the flow through the channel 150. For example, in a closed position, the channel 150 may not be aligned with the bypass flow passage 116, so no damper fluid can flow from the bypass flow passage 116 to the channel 150. In a fully open position, the channel 150 may be fully aligned with the bypass flow passage 116, such that maximum flow of damper fluid through the channel 150 can occur. In exemplary embodiments, such adjustment can advantageously be easily performed by a user by engaging the switch 152 connected to the spool valve 142. Alternatively, such adjustment may advantageously be easily performed by a user by otherwise engaging an outer surface of the spool valve 142.

As mentioned, second fluid circuit 104 may additionally include a bypass flow passage 116. The bypass flow passage 116 may be in fluid communication with, and disposed between, the second orifice 62 and the bypass flow passage 114. In exemplary embodiments as illustrated, a bypass valve assembly 160 may be disposed in the fluid chamber 72, and may meter the flow of damper fluid through the bypass flow passage 116.

Bypass valve assembly 160 may include a needle valve 162. Needle valve 162 may be adjustable to generally meter flow into and through the bypass flow passage 116. During a rebound stroke, if the needle valve 162 is open, damper fluid may flow from the second orifice 62 through the bypass flow passage 116 past the needle valve 162. This damper fluid may then flow through channel 150 if the spool valve 142 is open, and into the bypass flow passage 116. Adjustment of the needle valve 162 may adjust the flow through the bypass flow passage 116. For example, in a closed position, the needle valve 162 may block a portion of the bypass flow passage 116, preventing fluid flow through the bypass flow passage 116 past the needle valve 162. In a fully open position, the needle valve 162 may allow maximum flow of damper fluid through the bypass flow passage 116 past the needle valve 162. Such adjustment may advantageously be easily performed by a user by engaging an outer surface of the needle valve 162, which is accessible externally of the damper 10 generally. A screwdriver, allen wrench, or other suitable tool may be utilized to engage the needle valve 162, or a user may engage the adjustable knob by hand.

Referring briefly again to FIGS. 1 through 5, it should be noted that damper 10 may further include coupling features for coupling the damper 10 within a suspension system in, for example, an automobile, a truck, a motorcycle, a bicycle, an all-terrain vehicle or the like. As illustrated, for example, piston assembly 14 may include a coupling feature 200 (which may for example be connected to the second end 44 of the shaft 40), and fluid reservoir 16 may include a coupling feature 202. The coupling features 200, 202 in these embodiments are protrusions which define apertures therethrough. Alternatively, any suitable coupling features may be utilized. In exemplary embodiments, as illustrated, one or both coupling features 200, 202 may be coaxial with the damping assembly 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A twin tube damper, comprising:
    a damping assembly, the damping assembly defining a central longitudinal axis and comprising an inner tube and an outer tube, the inner tube surrounding and defining an inner fluid chamber, the outer tube generally surrounding the inner tube and inner fluid chamber and surrounding and defining an outer fluid chamber that generally surrounds the inner tube and inner fluid chamber, the outer fluid chamber in fluid communication with the inner fluid chamber, the damping assembly further defining a first orifice and a second orifice;

a piston assembly, the piston assembly comprising a piston disposed within the inner fluid chamber and movable generally along the central longitudinal axis relative to the inner tube;

a fluid reservoir in fluid communication with the damping assembly, the fluid reservoir comprising a flexible membrane, the flexible membrane generally coaxial with the damping assembly and spaced from the damping assembly along the central longitudinal axis, wherein the first orifice extends directly between the inner fluid chamber and the fluid reservoir such that the fluid reservoir is in fluid communication with the inner fluid chamber through the first orifice, and wherein the second orifice extends directly between the outer fluid chamber and the fluid reservoir such that the fluid reservoir is in fluid communication with the outer fluid chamber through the second orifice; and a spring assembly, the spring assembly comprising an inner tube and an outer tube, the inner tube of the spring assembly defining an inner fluid chamber, the outer tube of the spring assembly generally surrounding the inner tube of the spring assembly and defining an outer fluid chamber, the outer fluid chamber of the spring assembly in fluid communication with the inner fluid chamber of the spring assembly, and wherein at least a portion of a shaft of the piston assembly is disposed within the inner fluid chamber of the spring assembly.

2. The twin tube damper of claim 1, wherein the flexible membrane is deformable generally along the central longitudinal axis.

3. The twin tube damper of claim 1, wherein the fluid reservoir defines a fluid chamber and a biasing chamber, the fluid chamber of the fluid reservoir in fluid communication with the damping assembly, the flexible membrane separating the fluid chamber of the fluid reservoir and the biasing chamber of the fluid reservoir.

4. The twin tube damper of claim 3, wherein the fluid chamber of the fluid reservoir and the biasing chamber of the fluid reservoir are each generally coaxial with the damping assembly.

5. The twin tube damper of claim 3, wherein a biasing fluid is disposed within the biasing chamber and a damping fluid is flowable into the fluid chamber of the fluid reservoir, and wherein the biasing fluid is a gas and the damping fluid is a liquid.

6. The twin tube damper of claim 1, wherein the shaft extends between a first end and a second end, the first end and the second end spaced apart and generally coaxially aligned along the central longitudinal axis, the first end connected to the piston, the second end exterior to the damping assembly.

7. The twin tube damper of claim 1, wherein an auxiliary fluid is disposed within the spring assembly, and wherein the auxiliary fluid is a gas.

8. The twin tube damper of claim 1, wherein the inner tube and the outer tube of the spring assembly are each generally coaxial with the damping assembly.

9. The twin tube damper of claim 1, wherein the piston assembly further comprises a coupling feature.

10. The twin tube damper of claim 1, wherein the fluid reservoir further comprises a coupling feature.

11. The twin tube damper of claim 1, wherein a damping fluid is disposed within the damping assembly, and wherein the damping fluid is a liquid.

12. A twin tube damper, comprising:
a damping assembly, the damping assembly defining a central longitudinal axis and extending between a first end and a second end, the first end and the second end spaced apart and generally coaxially aligned along the central longitudinal axis, the damping assembly comprising an inner tube and an outer tube, the inner tube surrounding and defining an inner fluid chamber, the outer tube generally surrounding the inner tube and inner fluid chamber and surrounding and defining an outer fluid chamber that generally surrounds the inner tube and inner fluid chamber, the outer fluid chamber in fluid communication with the inner fluid chamber, the damping assembly further defining a first orifice and a second orifice;

a piston assembly, the piston assembly comprising a piston disposed within the inner fluid chamber and movable generally along the central longitudinal axis relative to the inner tube;

a fluid reservoir in fluid communication with the damping assembly and extending from the first end generally along the central longitudinal axis away from the damping assembly, the fluid reservoir comprising a flexible membrane, the flexible membrane deformable generally along the central longitudinal axis, wherein the first orifice extends directly between the inner fluid chamber and the fluid reservoir such that the fluid reservoir is in fluid communication with the inner fluid chamber through the first orifice, and wherein the second orifice extends directly between the outer fluid chamber and the fluid reservoir such that the fluid reservoir is in fluid communication with the outer fluid chamber through the second orifice; and a spring assembly, the spring assembly comprising an inner tube and an outer tube, the inner tube of the spring assembly defining an inner fluid chamber, the outer tube of the spring assembly generally surrounding the inner tube of the spring assembly and defining an outer fluid chamber, the outer fluid chamber of the spring assembly in fluid communication with the inner fluid chamber of the spring assembly.

13. The twin tube damper of claim 12, wherein the fluid reservoir defines a fluid chamber and a biasing chamber, the fluid chamber of the fluid reservoir in fluid communication with the damping assembly, the flexible membrane separating the fluid chamber of the fluid reservoir and the biasing chamber of the fluid reservoir.

14. The twin tube damper of claim 13, wherein the fluid chamber of the fluid reservoir and the biasing chamber of the fluid reservoir are spaced apart generally along the central longitudinal axis.

15. The twin tube damper of claim 13, wherein a biasing fluid is disposed within the biasing chamber of the fluid reservoir and a damping fluid is flowable into the fluid chamber of the fluid reservoir, and wherein the biasing fluid is a gas and the damping fluid is a liquid.

16. The twin tube damper of claim 12, wherein the piston assembly further comprises a shaft, the shaft extending between a first end and a second end, the first end and the second end spaced apart and generally coaxially aligned along the central longitudinal axis, the first end connected to the piston, the second end exterior to the damping assembly.

17. The twin tube damper of claim 12, wherein the inner tube and the outer tube of the spring assembly are each generally coaxial with the damping assembly.

18. The twin tube damper of claim 12, Wherein a damping fluid is disposed within the damping assembly, and wherein the damping fluid is a liquid.

\* \* \* \* \*